US012683464B2

(12) United States Patent
Swoboda et al.

(10) Patent No.: US 12,683,464 B2
(45) Date of Patent: Jul. 14, 2026

(54) ELECTRIC VEHICLE DRIVE UNIT COOLING SYSTEM

(71) Applicant: BRP-ROTAX GMBH & CO. KG, Gunskirchen (AT)

(72) Inventors: Eugen Swoboda, Schwanenstadt (AT); Thomas Kritzinger, Frankenburg am Hausruck (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 308 days.

(21) Appl. No.: 18/495,909

(22) Filed: Oct. 27, 2023

(65) Prior Publication Data

US 2024/0140192 A1 May 2, 2024

Related U.S. Application Data

(60) Provisional application No. 63/420,308, filed on Oct. 28, 2022.

(51) Int. Cl.
H02K 9/06 (2006.01)
B60K 11/06 (2006.01)
(Continued)

(52) U.S. Cl.
CPC ............... H02K 9/06 (2013.01); B60K 11/06 (2013.01); B60K 11/08 (2013.01); H02K 5/18 (2013.01);
(Continued)

(58) Field of Classification Search
CPC .. B60K 11/06; B60K 11/08; B60K 2001/006; B60K 7/0007; H02K 5/207; H02K 5/18; H02K 9/06; H02K 11/33; H02K 21/22
See application file for complete search history.

(56) References Cited

U.S. PATENT DOCUMENTS 9,450,474 B2 9/2016 Haag et al.
2006/0027192 A1* 2/2006 Tsukada .................... F01P 5/06
123/41.7
(Continued)

FOREIGN PATENT DOCUMENTS

CN 107959384 A * 4/2018 ............... H02K 9/06
DE 10313273 A1 10/2004
(Continued)

OTHER PUBLICATIONS

CN-107959384-A translation (Year: 2018).*
(Continued)

*Primary Examiner* — Timothy Hannon
(74) *Attorney, Agent, or Firm* — BCF LLP

(57) ABSTRACT

A drive unit for an electric vehicle has an outrunner motor. The outrunner motor has: a motor housing; a rotor disposed in the motor housing; a stator disposed in the motor housing and radially inward of the rotor, the stator having a plurality of stator coils; and an output shaft disposed radially inward of the stator, the output shaft being driven by the rotor, the output shaft and the rotor rotating together about an output shaft axis defined by the output shaft. The vehicle also has an inverter electrically connected to the plurality of stator coils, the inverter having an inverter housing connected to the motor housing; and a fan disposed between the stator and the inverter housing, the fan being configured to draw air between the motor housing and the inverter housing and to supply this air into the motor housing.

14 Claims, 13 Drawing Sheets

(51) Int. Cl.

| | |
|---|---|
| B60K 11/08 | (2006.01) |
| H02K 5/18 | (2006.01) |
| H02K 5/20 | (2006.01) |
| H02K 11/33 | (2016.01) |
| H02K 21/22 | (2006.01) |
| B60K 1/00 | (2006.01) |

(52) U.S. Cl.
CPC ............. *H02K 5/207* (2021.01); *H02K 11/33* (2016.01); *H02K 21/22* (2013.01); *B60K 2001/006* (2013.01)

(56)  References Cited

U.S. PATENT DOCUMENTS

| | | | |
|---|---|---|---|
| 2015/0263591 | A1 | 9/2015 | Maschke et al. |
| 2017/0141642 | A1 | 5/2017 | Geissler et al. |
| 2017/0366074 | A1* | 12/2017 | Fröhlich ................ H02K 11/33 |
| 2018/0309341 | A1* | 10/2018 | Pokorny ................ H02K 5/132 |
| 2020/0014285 | A1* | 1/2020 | Chang .................... H02K 5/207 |
| 2021/0155092 | A1* | 5/2021 | Kronsteiner ............. B60K 1/00 |
| 2025/0096646 | A1* | 3/2025 | Nagai ...................... H02K 9/14 |

FOREIGN PATENT DOCUMENTS

| | | |
|---|---|---|
| DE | 102016015535 A1 | 6/2018 |
| EP | 1624230 A2 | 2/2006 |
| EP | 3354937 A1 | 8/2018 |

OTHER PUBLICATIONS

Extended European Search Report issued from the EPO on Mar. 20, 2024 in connection with the corresponding Application No. 23206543.3.

* cited by examiner

ELECTRIC VEHICLE DRIVE UNIT COOLING SYSTEM

CROSS-REFERENCE

The present application claims priority to U.S. Provisional Patent Application 63/420,308, filed Oct. 28, 2022, the entirety of which is incorporated herein by reference.

TECHNICAL FIELD

The present technology relates generally to cooling systems for electric vehicle drive units, and more particularly for electric kart drive units.

BACKGROUND

Karts are motor vehicles that are used for leisure and sporting activities. Some karts are powered by an electric drive unit, which includes an electric motor and power electronic. A chain is often used to transmit power from the electric motor to the rear-wheel axle. This chain is routed around a motor pinion and a sprocket that is mounted on the rear-wheel axle.

In order to operate efficiently, the drive unit needs to be cooled. One solution consists in providing a liquid cooling system. Liquid cooling system are very efficient at cooling components. However, such systems are relatively heavy due to the weight of all of its components which include a pump, a coolant reservoir, and a radiator, and due to the weight of the coolant itself. Furthermore, finding a suitable location for all of these components on a kart, which is relatively small, can be difficult. Finally, using liquid to cool electrical and electronic components can be challenging from an engineering perspective since a coolant leak could damage these components.

There is therefore a desire for a cooling system for an electric vehicle drive unit, and more particularly for an electric kart drive unit, which addresses at least some of the above described drawbacks.

SUMMARY

It is an object of the present to ameliorate at least some of the inconveniences present in the prior art.

According to an aspect of the present technology, there is provided a drive unit for an electric vehicle having an outrunner motor. The outrunner motor has: a motor housing; a rotor disposed in the motor housing, the rotor having a sleeve and a plurality of permanent magnets connected to a radially inward side of the sleeve; a stator disposed in the motor housing and radially inward of the rotor, the stator having a plurality of stator coils; and an output shaft disposed in part in the motor housing and radially inward of the stator, an end of the output shaft being disposed externally of the motor housing, the output shaft being operatively connected to and driven by the rotor, the output shaft and the rotor rotating together about an output shaft axis defined by the output shaft. The vehicle also has an inverter electrically connected to the plurality of stator coils, the inverter having an inverter housing connected to the motor housing, the output shaft axis extending through the inverter housing; and a fan disposed between the stator and the inverter housing, the fan being configured to draw air between the motor housing and the inverter housing and to supply this air into the motor housing.

In some embodiments of the present technology, the fan is operatively connected to and driven by the rotor.

In some embodiments of the present technology, the fan rotates together with the output shaft and the rotor about the output shaft axis.

In some embodiments of the present technology, the fan connects the rotor to the output shaft.

In some embodiments of the present technology, the fan has: an outer ring connected to the rotor; a inner ring connected to the output shaft; and a plurality of fan blades extending radially between the outer ring and the inner ring.

In some embodiments of the present technology, the fan also has a plurality of arms connecting the outer ring to the inner ring; and the plurality of fan blades is connected to the plurality of arms.

In some embodiments of the present technology, the fan blades of the plurality of fan blades are clipped onto the arms of the plurality of arms.

In some embodiments of the present technology, each fan blade of the plurality of fan blades has a plurality of fins on a face of the fan blade facing away from the stator.

In some embodiments of the present technology, a drive sprocket is mounted to the end of the output shaft disposed externally of the motor housing. The drive sprocket and the inverter are disposed on opposite sides of the stator.

In some embodiments of the present technology, the inverter housing defines a plurality of inverter cooling fins on a face of the inverter housing facing the fan.

In some embodiments of the present technology, an air intake duct is connected to the motor housing and the inverter housing for supplying air between the motor housing and the inverter housing to the fan and over the inverter cooling fins.

In some embodiments of the present technology, the motor housing defines a plurality of motor cooling fins on a face of the motor housing facing away from the inverter and the fan; and the output shaft passes through the face of the motor housing facing away from the inverter and the fan.

In some embodiments of the present technology, an air intake is duct connected to the motor housing and the inverter housing for supplying air between the motor housing and the inverter housing to the fan and for supplying air over the motor cooling fins.

According to another aspect of the present technology, there is provided an electric kart having: a frame; a seat connected to the frame; two front wheels rotationally connected to the frame; a steering wheel operatively connected to the two front wheels; a rear-wheel axle rotationally connected to the frame; two rear wheels connected to the rear-wheel axle; a battery pack connected to the frame; and a drive unit according to one of the above embodiments connected to the frame. The output shaft is operatively connected to the rear-wheel axle to drive the two rear wheels. The battery pack is electrically connected to the inverter.

In some embodiments of the present technology, the output shaft axis extends laterally.

In some embodiments of the present technology, an air intake duct is connected to the motor housing and the inverter housing for supplying air between the motor housing and the inverter housing to the fan.

In some embodiments of the present technology, the battery pack is disposed in front of the motor; and a front end of the air intake duct extends over the battery pack.

In some embodiments of the present technology, an inlet of the air intake duct is vertically higher than an outlet of the air intake duct.

In some embodiments of the present technology, the drive unit is disposed laterally on one side of the seat.

In some embodiments of the present technology, the motor is disposed longitudinally between the battery pack and the rear-wheel axle.

In some embodiments of the present technology, the battery pack is a first battery pack; the electric kart also has a second battery pack; and the seat is disposed laterally between the first and second battery packs.

For purposes of this application, terms related to spatial orientation such as forward, rearward, upwardly, downwardly, left, and right, are as they would normally be understood by an operator of the vehicle riding thereon in a normal driving position. Terms related to spatial orientation when describing or referring to components or sub-assemblies of the vehicle, separately from the vehicle, should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
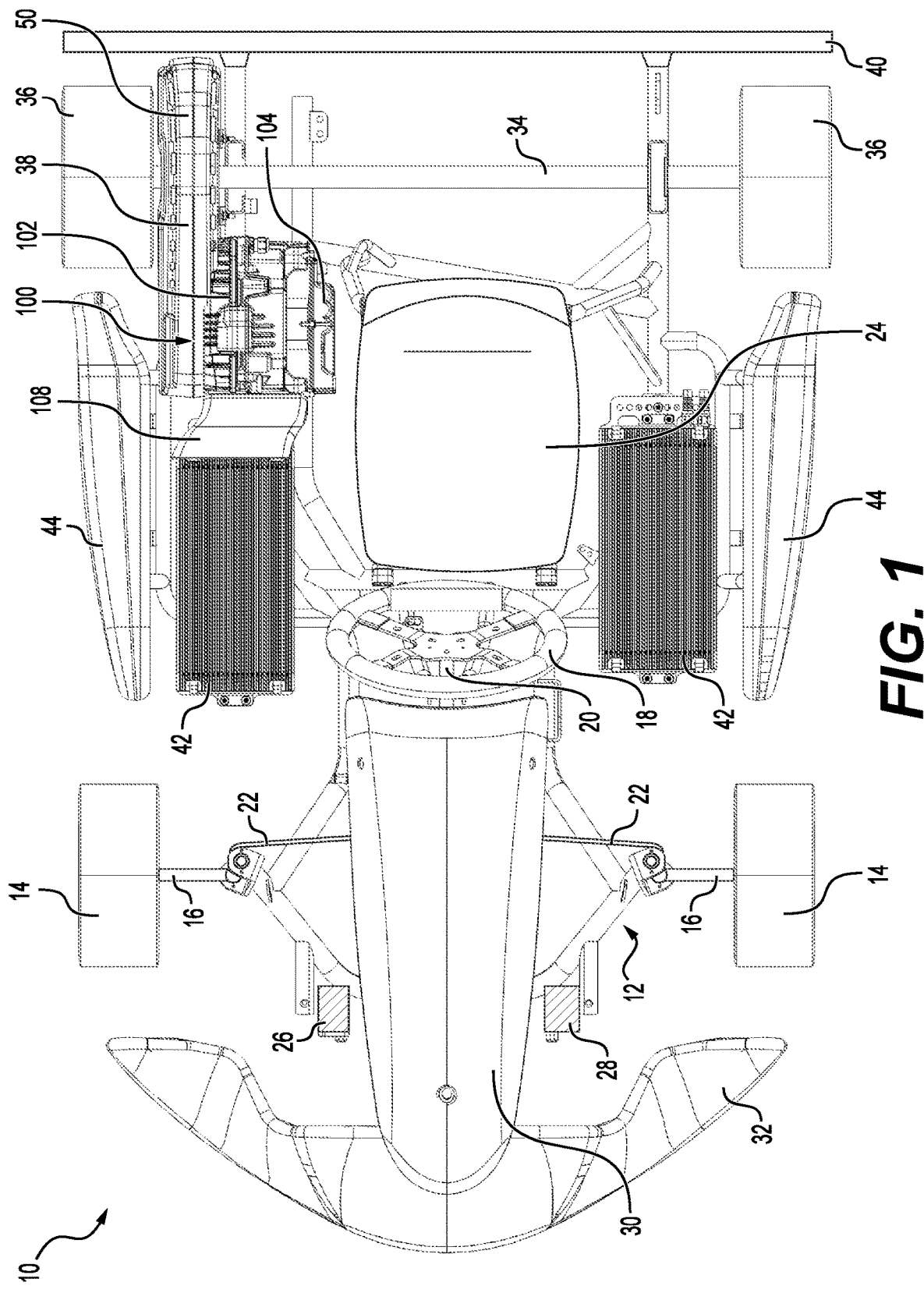
FIG. 1 is a top plan view of an electric kart.
Figure 2:
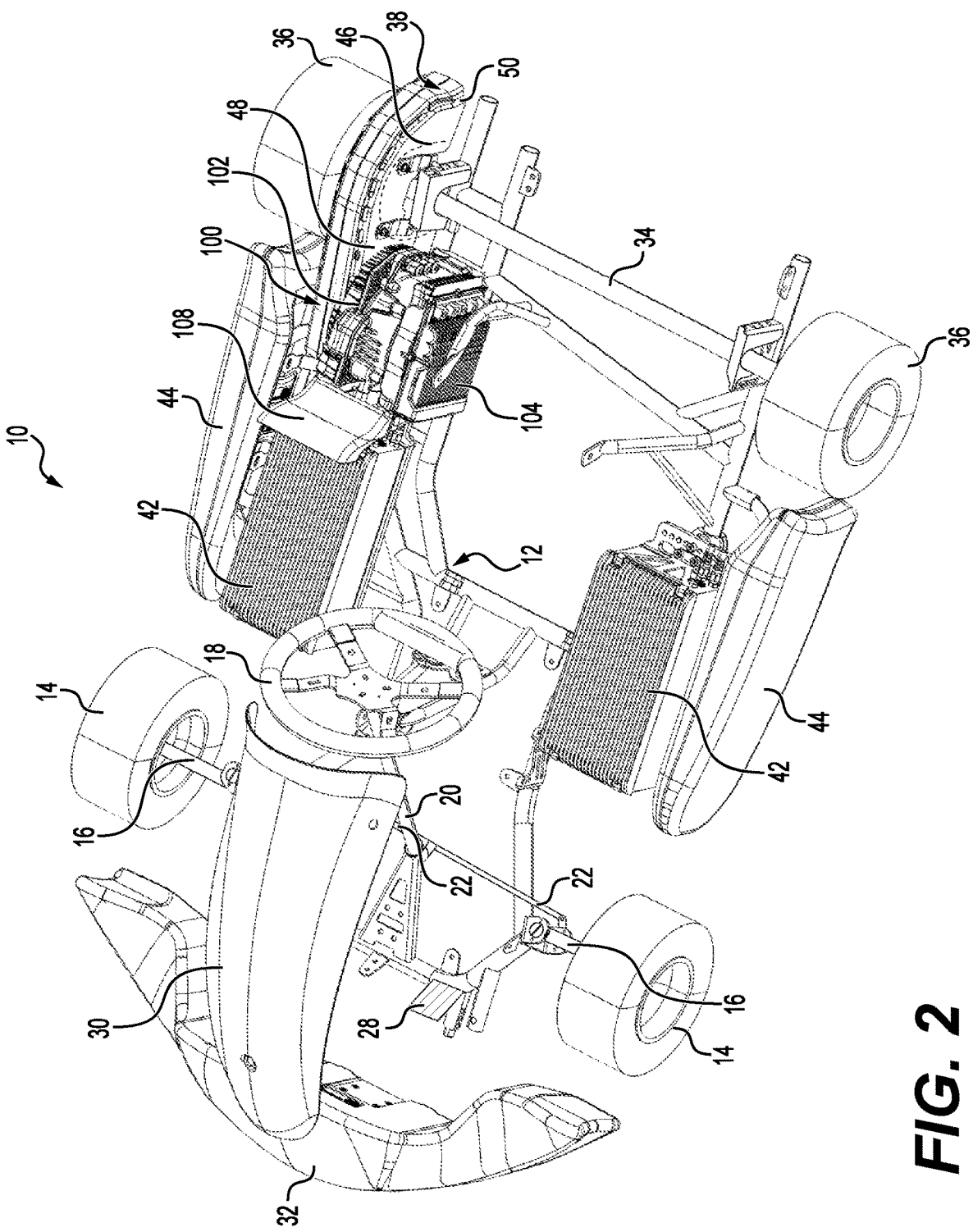
FIG. 2 is a perspective view, taken from a rear, left side of the kart of FIG. 1, with a seat and a rear bumper removed.
Figure 3:
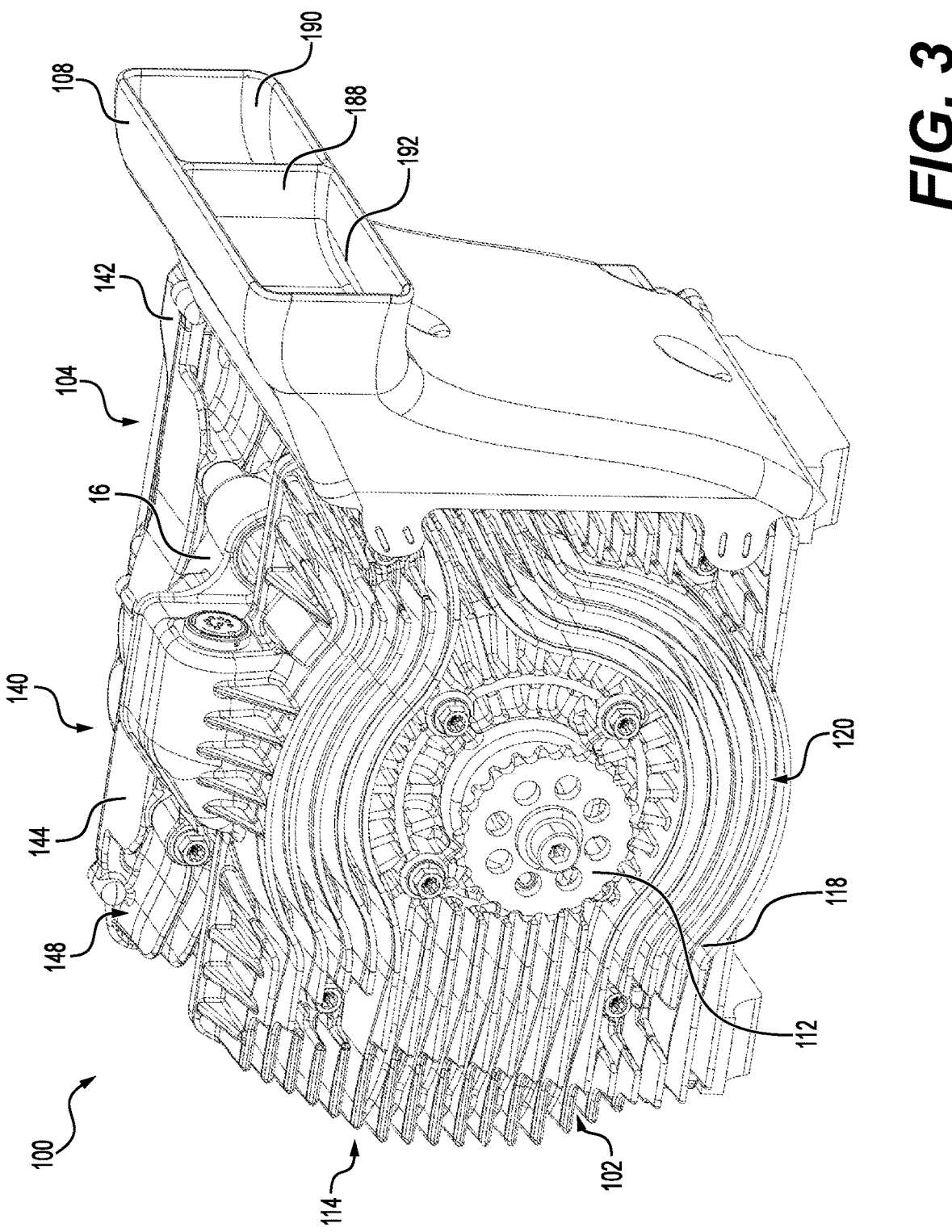
FIG. 3 is a perspective view taken from a front, right side of a drive unit of the kart of FIG. 1.

A kart 10 having a drive unit 100 will be described with reference to FIGS. 1 and 2. It is contemplated that the drive unit 100 and alternative embodiments thereof could be provided in electric vehicles other than karts.

The kart 10 has a tubular structure defining a frame 12. The frame 12 is made from a plurality of hollow cylindrical steel members and steel brackets that are welded to each other. It is contemplated that at least some of the hollow cylindrical members could be replaced by other types of members such as solid cylindrical members, hollow tubes having a cross-section other than circular, and beams, for example. It is also contemplated that the members and brackets could be made of another type of metal, such as aluminum for example. It is also contemplated that at least some of the members and brackets could be made of a non-metallic material, such as composite materials or plastics for example. It is also contemplated that at least some of the members and brackets could be joined to each other by means other than welding, such as by fastening and bonding for example. It is also contemplated that two or more of the members and brackets described above could be cast or otherwise formed as a single component. It is also contemplated that the frame 12 could have more or less members and brackets than illustrated in FIGS. 1 and 2, depending on the type of materials used, the required strength and rigidity of the frame 12 and the weight of the components attached to the frame 12.

Two front wheels 14 are rotationally connected to the frame 12 via front-wheel axles 16. Front disk brake assemblies (not shown) are provided on the front-wheel axles 16 to brake the front wheels 14. A steering wheel 18 is connected to a steering column 20. The lower end of the steering column 20 is connected to the front-wheel axles 16 via steering links 22 to turn the front-wheel axles 16, and thereby the front wheels 14, for steering the kart 10. A seat 24 is connected to the frame 12 rearward of the steering wheel 18. An accelerator pedal 26 and a brake pedal 28 are provided forward of the seat 24. A nose cone 30 is connected to the frame 12 and is disposed over the steering column 20 in front of the steering wheel 18. The nose cone 30 is connected to a front wing 32. The front wing 32 is disposed forward of the front wheels 14 and the pedals 26, 28.

A rear-wheel axle 34 is rotationally connected to the frame 12 rearward of the seat 24. Two rear wheels 36 are connected to the ends of the rear-wheel axle 34. A rear disk brake assembly (not shown) is provided on the rear-wheel axles 34 to brake the rear wheels 36. The rear-wheel axle 34 is driven by the drive unit 100 via a chain drive assembly 38 as will be described in more detail below. A rear bumper 40 is connected to the rear of the frame 12 and extends behind the rear wheels 36.

Two battery packs 42 supply electric power to the drive unit 100. One battery pack 42 is connected to the frame 12 on each of the left and right sides of the seat 24 such that the seat 24 is laterally between the battery packs 42. It is contemplated that the kart 10 could have only one or more than two battery packs 42. The drive unit 100 is connected to the frame 12, is disposed laterally on the right side of the seat 24, and a majority of the drive unit 100 is disposed behind the right side battery pack 42. It is contemplated that in some embodiments, the drive unit 100 could be disposed laterally on the left side of the seat 24. Left and right bumpers 44 are connected to the frame 12. The bumpers 44 are disposed laterally outward of the battery packs 42 and longitudinally between the front and rear wheels 14, 36.

Figure 7:
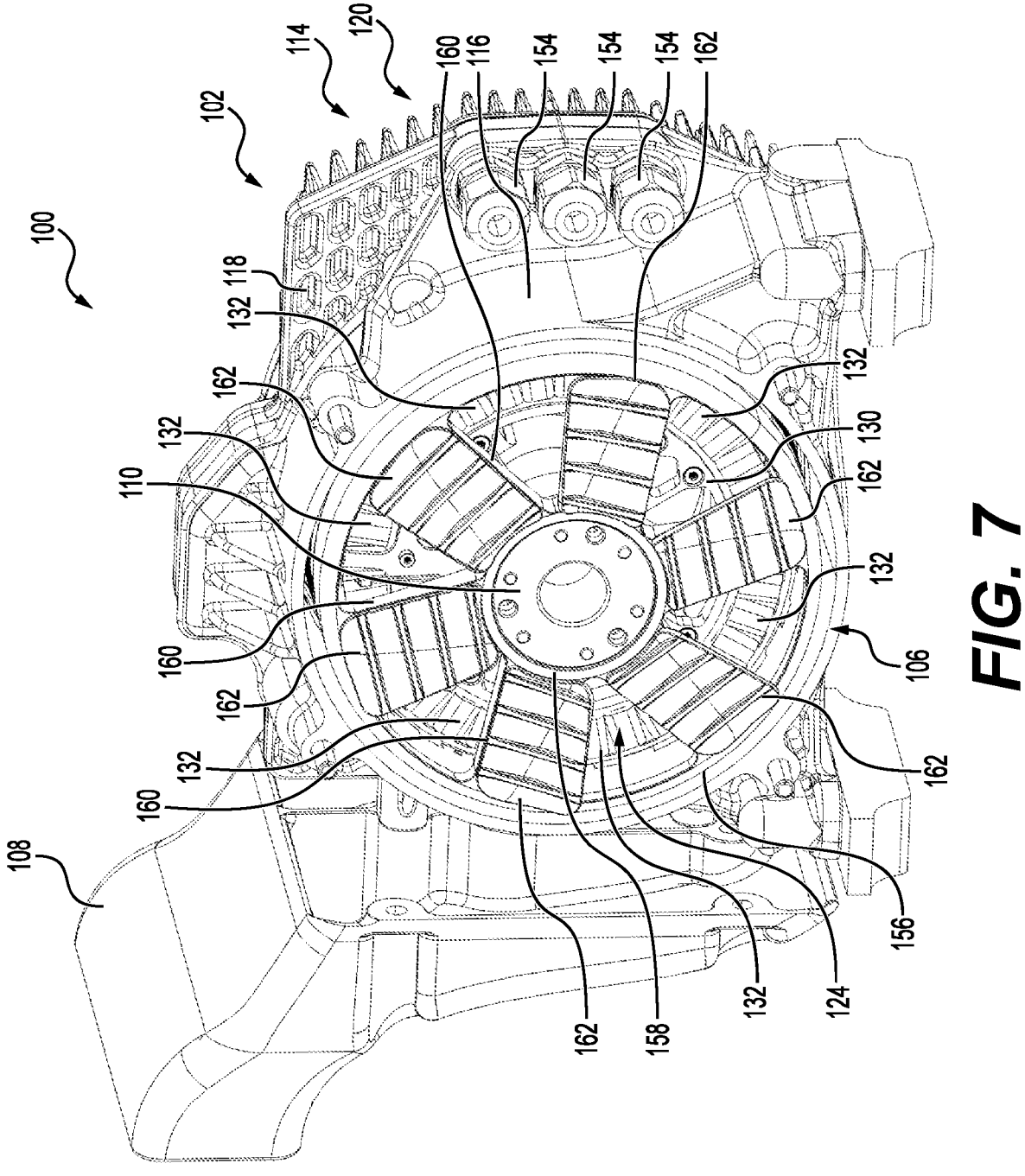
FIG. 7 is a perspective view taken from a rear, left side of the drive unit of FIG. 3 with an inverter removed.
Figure 8:
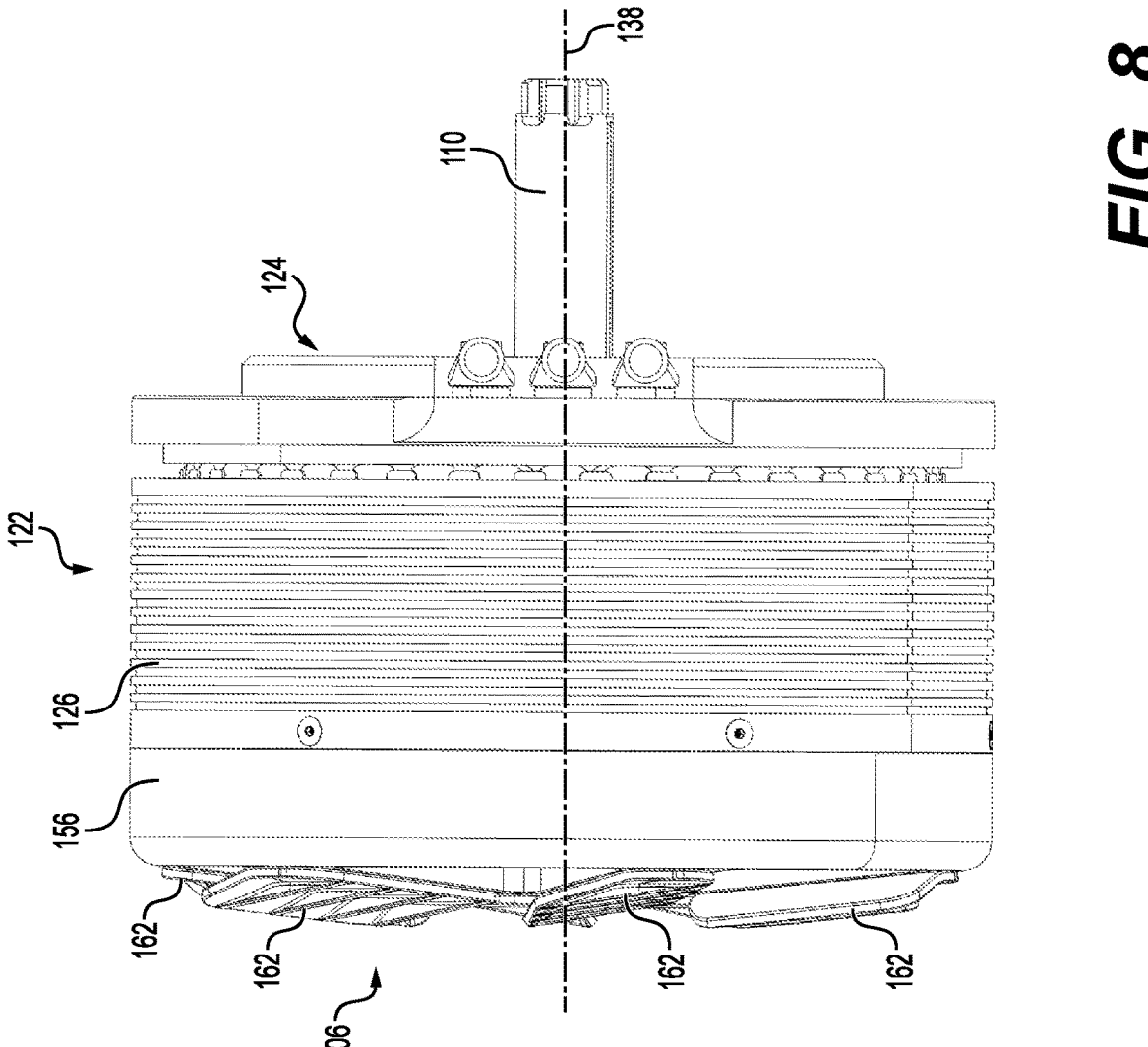
FIG. 8 is a rear elevation view of an electric motor and a fan of the drive unit of FIG. 3, with a housing of the motor being removed.
Figure 9:
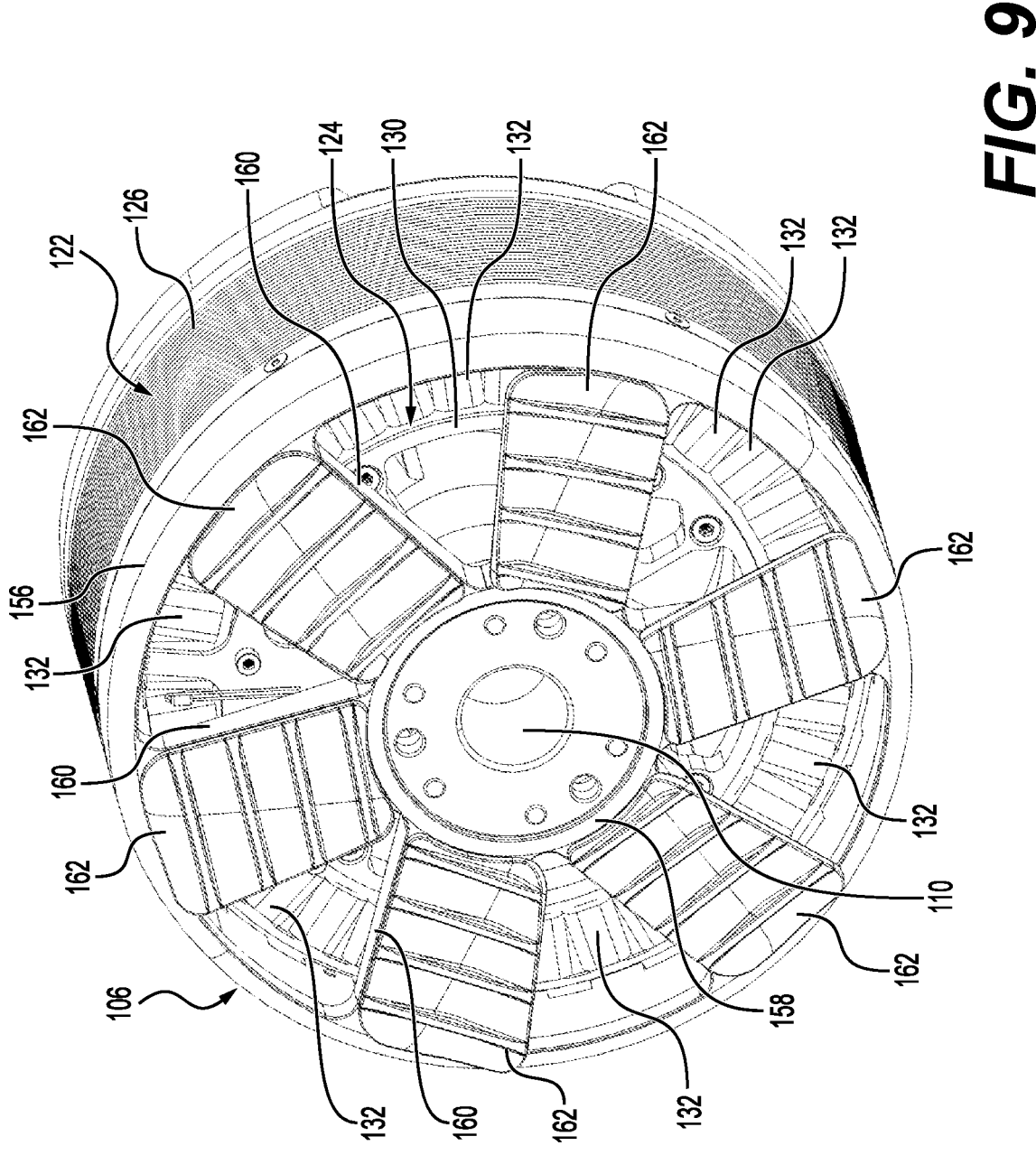
FIG. 9 is a perspective view taken from a rear, left side of the components of FIG. 8.

The drive unit 100 includes an electric motor 102, an inverter 104, a fan 106 (FIG. 7) and an air intake duct 108. The electric motor 102, the inverter 104 and the fan 106 are disposed longitudinally between the right side battery pack 42 and the rear-wheel axle 34. As will be described in more detail below, the air intake duct 108 supplies air to the fan 106. Since the right side battery pack 42 is disposed in front of the electric motor 102, the inverter 104 and the fan 106, a front end of the air intake duct 108 extends over the right side battery pack 42 such that air flow to an inlet of the air intake duct 108 is not blocked by the right side battery pack 42.

Each battery pack 42 is electrically connected to the inverter 104 by a battery management system (BMS) module (not shown). Each BMS module is integrated in its corresponding battery pack 42. It is contemplated that the BMS modules could be separate from the battery packs 42. The inverter 104 converts the direct current (DC) from the battery packs 42 to alternating current (AC) and supplies the AC to the electric motor 102. In the present embodiment, the electric motor 102 is an AC motor. More specifically, the electric motor 102 is a permanent magnet synchronous motor (PMSM). It is contemplated that other types of electric motors could be used.

Figure 5:
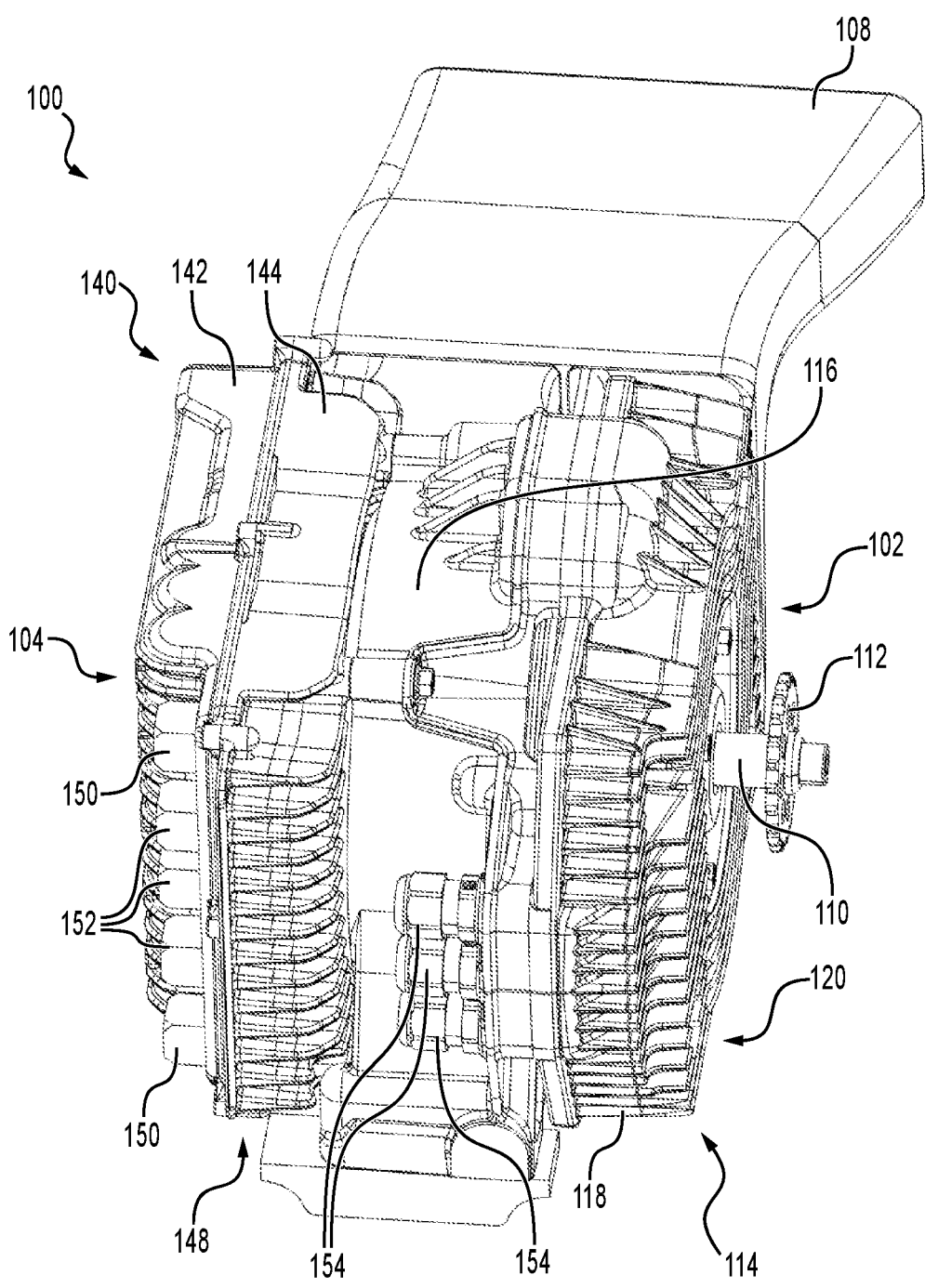
FIG. 5 is a perspective view taken from a rear, right side of the drive unit of FIG. 3.

The electric motor 102 has an output shaft 110 (FIG. 5). In the present embodiment, the output shaft 110 extends laterally. A drive sprocket 112 (FIG. 5) is connected to the end of the output shaft 110. With reference to FIG. 2, the drive sprocket 112 drives a driven sprocket 46 of the chain drive assembly 38 via a chain 48. The drive sprocket 112, the driven sprocket 46 and the chain 48 are provided in a chain drive housing 50 of the chain drive assembly 38. The driven sprocket 46 is mounted to the rear-wheel axle 34 to drive the rear-wheel axle 34 and the rear wheels 36.

Turning now to FIGS. 3 to 13, the drive unit 100 will be described in more detail.

The electric motor 102 has a motor housing 114 made of aluminum. It is contemplated that other materials could be used. The motor housing 114 has a main housing section 116 that defines a circular opening on a left side thereof, and a side cover 118 fastened to the main housing section 116 and defining a right side of the motor housing 114. The side cover 118 defines a plurality of motor cooling fins 120 on the right face of the motor housing 114 (i.e. the face of the motor housing 114 facing away from the inverter 104 and the fan 106). As best seen in FIGS. 6 to 9, the motor 102 has a rotor 122 and a stator 124 disposed in the motor housing 114. The stator 124 is radially inward of the rotor 122. During operation, the rotor 122 turns around the stator 124. As such, the electric motor 102 is an outrunner motor 102. The rotor 122 has a sleeve 126 and a plurality of permanent magnets 128 connected to a radially inward side of the sleeve 126. The stator 124 has an annular core 130 and a plurality of stator coils 132 (only some of which are labeled) mounted to the annular core 130. The stator coils 132 are disposed radially between the annular core 130 and the permanent magnets 128. The stator coils 132 are electrically connected to the inverter 104, as will be described in more detail below. The output shaft 110 is disposed at the center of the rotor 122 and the stator 124, and is therefore radially inward of the rotor 122 and the stator 124. The output shaft 110 has a portion inside the motor housing 114, and the right portion of the output shaft 110 passes through the side cover 118 such that the right end of the output shaft is disposed externally of the motor housing 114. As such, the drive sprocket 112 and the inverter 104 are disposed on opposite sides of the stator 124. The output shaft 110 is rotationally supported in the electric motor 102 by two ball bearings 134 disposed radially between the stator 124 and the output shaft 110 and by one ball bearing 136 disposed radially between the side cover 118 and the output shaft 110. The axis of rotation of the output shaft 110 is referred to herein as the output shaft axis 138. The fan 106 connects the sleeve 126 of the rotor 122 to the left end of the output shaft 110 as will be described in greater detail below. As a result, the rotor 122 drives the fan 106 and the fan 106 drives the output shaft 110 such that the rotor 122, the fan 106 and the output shaft 110 rotate together about the output shaft axis 138. It is contemplated that in alternative embodiments the output shaft 110 could be driven by the rotor 122 independently of the fan 106. For example, a plurality of spokes could be connected radially between the sleeve 126 of the rotor 122 and the output shaft 110.

Figure 4:
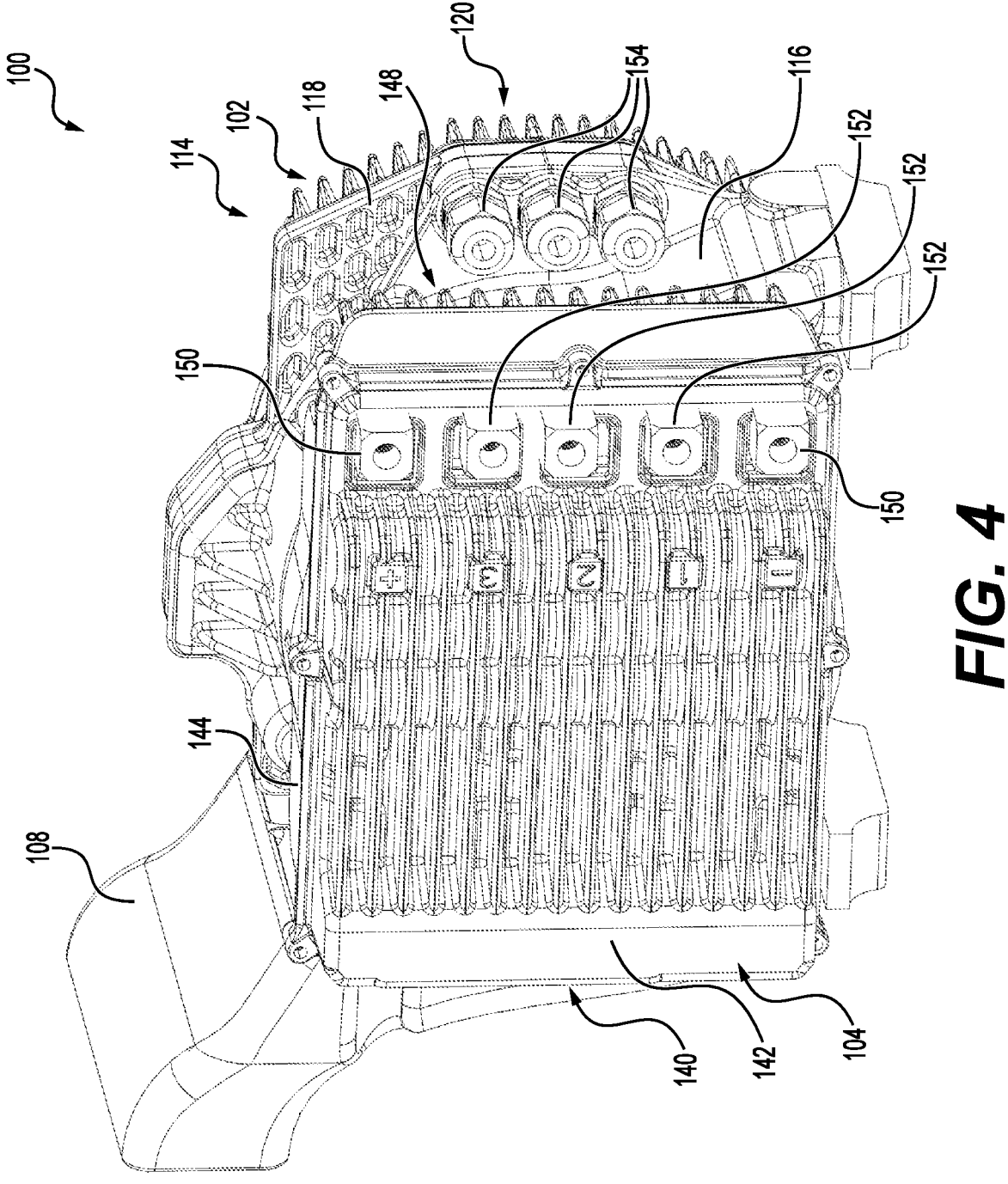
FIG. 4 is a perspective view taken from a rear, left side of the drive unit of FIG. 3.
Figure 6:
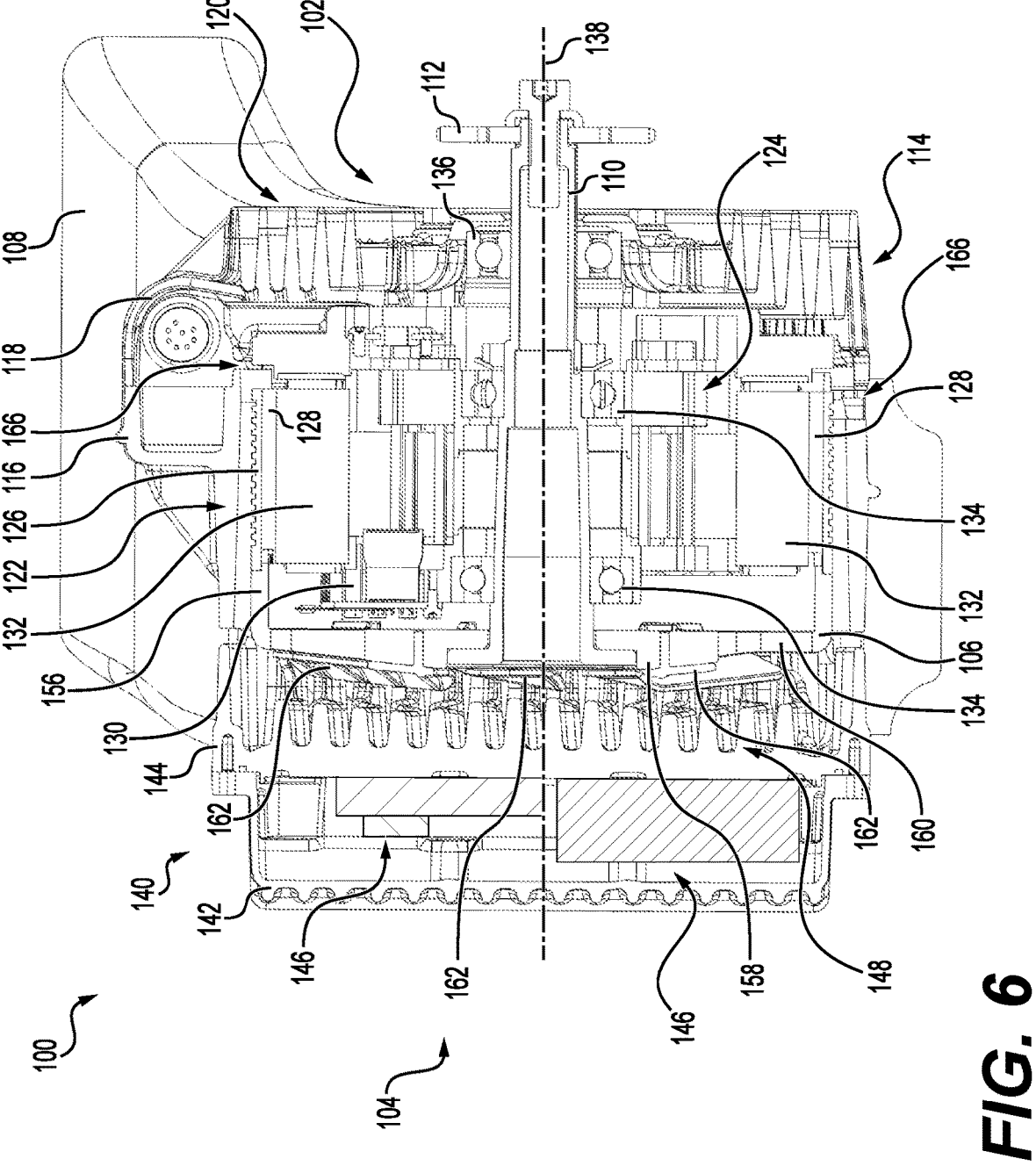
FIG. 6 is cross-section of the drive unit of FIG. 3 taken vertically through an output shaft of the drive unit.

With reference to FIG. 6, the inverter 104 has an inverter housing 140 made of aluminum. It is contemplated that other materials could be used. The inverter housing 140 is fastened to the left side of the motor housing 114 such that the fan 106 is disposed between the stator 124 and the inverter housing 140. The inverter housing 140 has a receptacle 142 and a side cover 144 closing the open right side of the receptacle 140. The power electronics 146 of the inverter 104 are disposed inside the housing 140. More specifically, the power electronics 146 are bonded to the left side of the side cover 144 by a thermally conductive adhesive to promote heat transfer between the power electronics 146 and the side cover 144. The side cover 144 defines a plurality of inverter cooling fins 148 on the right face of the inverter housing 140 (i.e. the face of the inverter housing 140 facing the fan 106). With reference to FIG. 4, the positive and negative poles of the battery packs 42 are electrically connected to the power electronics 146 of the inverter by power cables (not shown) connected to the connectors 150 on a left side of the inverter housing 140. Three power cables (not shown, one per phase of the three-phase AC) electrically connect the power electronics 146 to the stator coils 132 of the stator 124. These three power cables are connected between three connectors 152 on the left side of the inverter housing 140 and three connectors 154 on a left side of the motor housing 114.

With reference to FIGS. 6 to 13, the fan 106 has an outer ring 156 fastened to the left end of the sleeve 126 of the rotor 122 and an inner ring 158 connected to the left end of the output shaft 110. The fan 106 has a plurality of arms 160 connecting the outer ring 156 to the inner ring 158. The fan 106 also has a plurality of fan blades 162 that that extend radially between the outer ring 156 and the inner ring 158. In the present embodiment, the fan 106 has six fan blades 162, but it is contemplated that there could be more or less fan blades 162. Each fan blade 162 is connected to two arms 160 of the plurality of arms 160. As best seen in FIGS. 10 to 13, each fan blade 162 has two clip arms 164 that extend toward the right and which clip onto the right side of the two arms 162 corresponding to the fan blade 162. It is contemplated that the fan blades 162 could be connected differently. For example, the arms 160 could be omitted and the fans blades 162 could connect the outer ring 156 to the inner ring 158. As the rotor 122 turns the fan 106 about the output shaft axis 138, the fan blades 162 draw air between the motor housing 114 and supply this air into the motor housing 114 to cool the components of the motor 102. More specifically, the air flows around the stator coils 132 radially between the sleeve 126 and the core 130 and radially between the stator 124 and the output shaft 110. The heated air flows out of the motor housing 114 via gaps 166 (FIG. 6) between the main housing section 116 and the side cover 118 of the motor housing 114.

Figure 10:
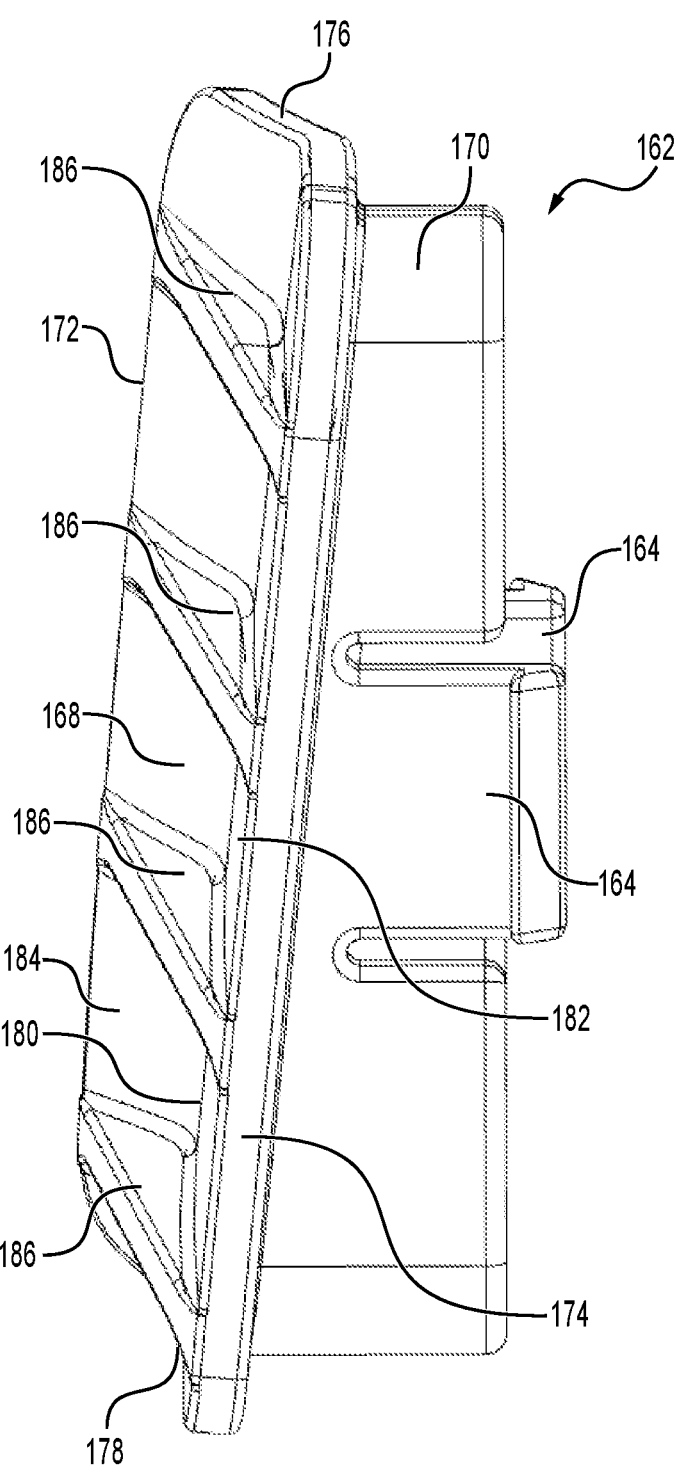
FIG. 10 is a view of a trailing edge side of a fan blade of the fan of FIG. 8.
Figure 11:
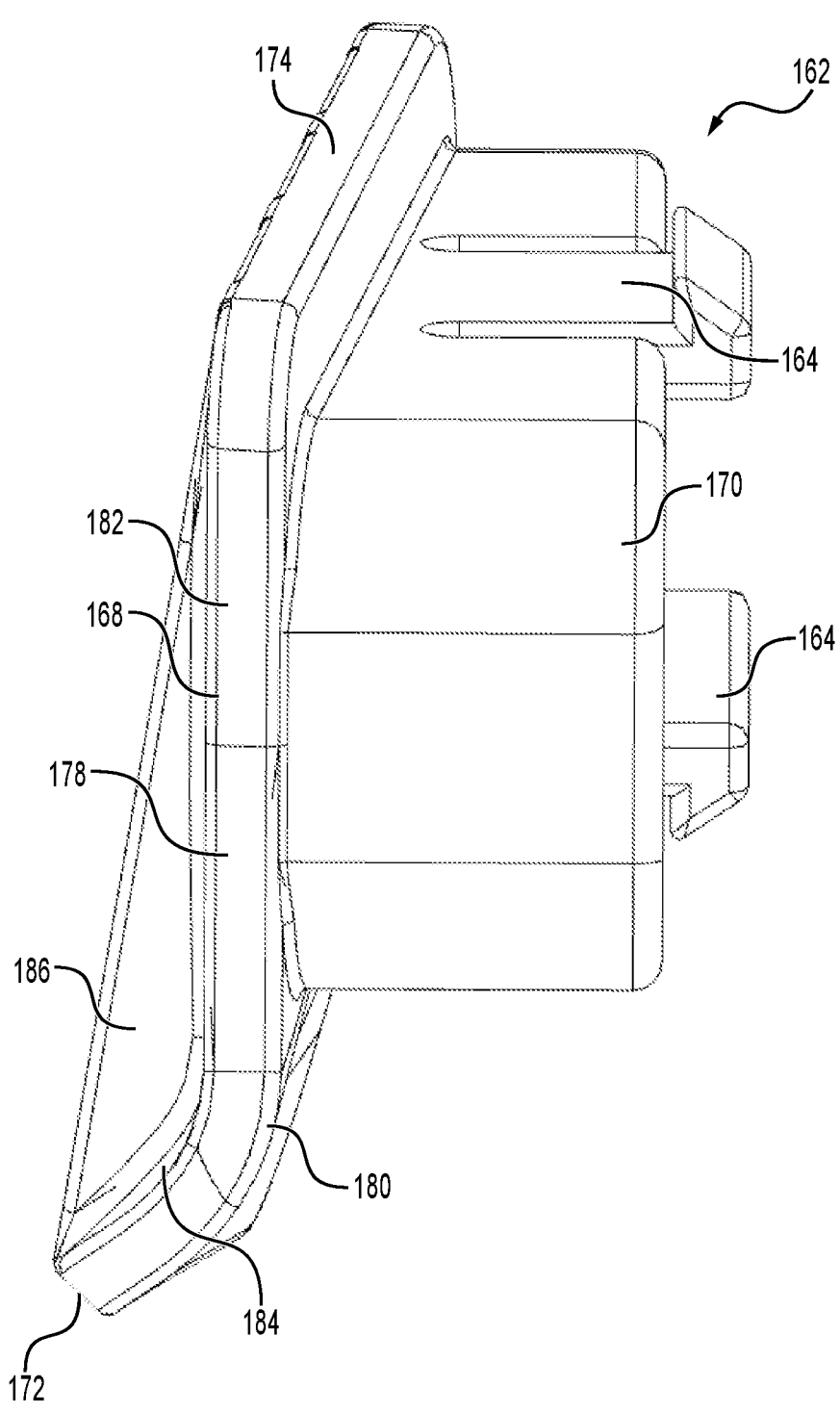
FIG. 11 is a view of a radially inner side of the fan blade of FIG. 10.
Figure 12:
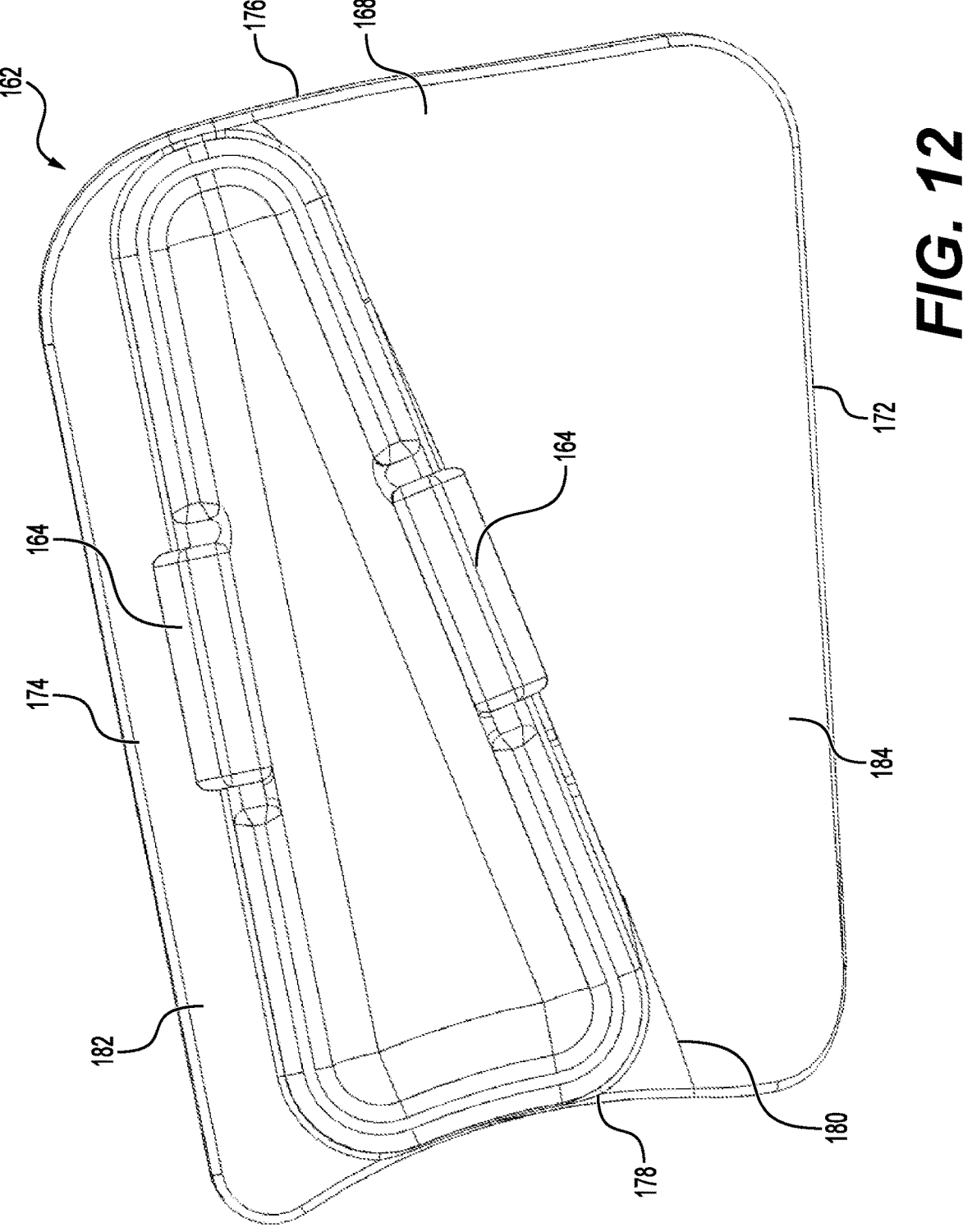
FIG. 12 is a right side elevation view of the fan blade of FIG. 10.
Figure 13:
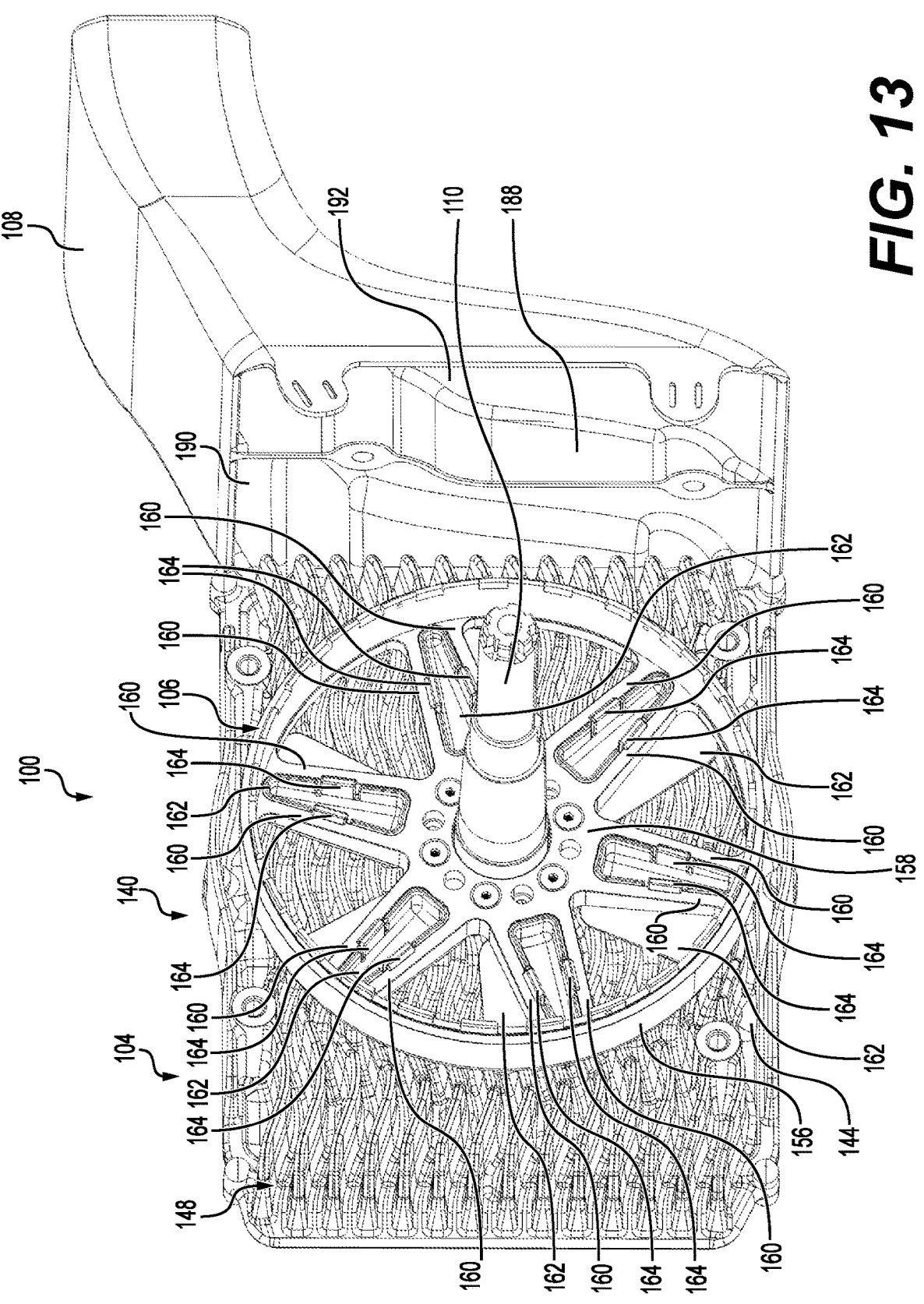
FIG. 13 is a perspective view taken from a rear, right side of the drive unit of FIG. 3, with the electric motor removed.

With reference to FIGS. 10 to 12, one fan blade 162 will be described in more detail. The other fan blades 162 are identical to the fan blade 162 illustrated in FIGS. 10 to 12. The fan blade 162 has a blade body 168 and a blade insert 170 extending right from the right face of the blade body 168. The blade insert 170 includes the clip arms 164. The blade insert 170 is generally trapezoidally-shaped to fit in the space defined between the outer ring 156, the inner ring 158 and the two arms 160 to which the clip arms 164 are clipped (see FIG. 13). The blade body 168 has a leading edge 172, a trailing edge 174, a blade tip 176 and a blade root 178. As can be seen in FIG. 10, the blade body 168 extends upward and rightward from the blade root 178 to the blade tip 176. The blade body 168 also has a bend 180 extending from the blade root 178 to the blade tip 176. The bend 180 separates the blade body 168 into a first blade section 182 extending between the bend 180 and the trailing edge 174 and a second blade section 184 extending between the bend 180 and the leading edge 172. As can be seen, the second blade section 184 extends toward the left as it extends from the bend 180 to the leading edge 172. The fan blade 168 also has four fins 186 on its left face (i.e. the face of the fan blade 168 facing away from the stator 124) that are connected between the first and second blade sections 182, 184. It is contemplated that the fan blade 168 could have more or less than four fins 186. It is also contemplated that the fins 186 could be omitted. It is contemplated that the fan blade 168 could have a different construction and geometry.

With reference to FIGS. 3 to 7 and 13, it can be seen that the air intake duct 108 is connected to the front of the motor housing 114 and to the front of the inverter housing 140. The front end of the air intake duct 108 faces forward such that when the kart 10 moves forward air flows into the air intake duct 108. The inlet at the front end of the air intake duct 108 is vertically higher than the outlet at the rear of the air intake duct 108. The inlet of the air intake duct 108 is also slightly more to the right than the outlet of the air intake duct 108. The outlet of the air intake duct 108 is taller and has a larger surface area than the inlet of the air intake duct 108. A wall 188 extends longitudinally in the air intake duct 108 to define a left air passage 190 and a right air passage 192. Air flowing in the left air passage 190 flows between the motor housing 114 and the inverter housing 140 to the fan 106 and over the inverter cooling fins 148. The inverter cooling fins 148 are shaped to form channels that cause the air from the left air passage 190 to flow over most of the right face of the inverter housing 140 and to increase a length of the path the air has to take (compared to a straight line) to flow across the right face of the inverter housing 140 to increase cooling of the right face of the inverter housing 140 and therefore of the power electronics 146 inside the inverter housing 140. Air flowing in the right air passage 192 flows over the motor cooling fins 118. The motor cooling fins 118 are shaped to form channels that cause the air from the right air passage 192 to flow over most of the right face of the motor housing 114 and to increase a length of the path the air has to take (compared to a straight line) to flow across the right face of the motor housing 114 to increase cooling of the right face of the motor housing 114 and therefore of the components of the electric motor 102 disposed inside the motor housing 114. It is contemplated that the wall 188 could be omitted. It is contemplated that more than one air intake duct could be provided. It is contemplated that in some embodiments the air intake duct 108 could supply air between the motor housing 114 and the inverter housing 140, but not over the right face of the motor housing 114. It is contemplated that in some embodiments the air intake duct 108 could be omitted.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A drive unit for an electric vehicle comprising:
an outrunner motor comprising:
  a motor housing;
  a rotor disposed in the motor housing, the rotor having a sleeve and a plurality of permanent magnets connected to a radially inward side of the sleeve;
  a stator disposed in the motor housing and radially inward of the rotor, the stator having a plurality of stator coils; and
  an output shaft disposed in part in the motor housing and radially inward of the stator, an end of the output shaft being disposed externally of the motor housing, the output shaft being operatively connected to and driven by the rotor, the output shaft and the rotor rotating together about an output shaft axis defined by the output shaft;
an inverter electrically connected to the plurality of stator coils, the inverter having an inverter housing connected to the motor housing, the output shaft axis extending through the inverter housing; and
a fan disposed between the stator and the inverter housing, the fan being operatively connected to and driven by the rotor,
the fan connecting the rotor to the output shaft,
the fan rotating together with the output shaft and the rotor about the output shaft axis,
the fan being configured to draw air between the motor housing and the inverter housing and to supply this air into the motor housing, and
the fan comprising:
  an outer ring connected to the rotor;
  an inner ring connected to the output shaft; and
  a plurality of fan blades extending radially between the outer ring and the inner ring.

2. The drive unit of claim 1, wherein:
the fan further comprises a plurality of arms connecting the outer ring to the inner ring; and
the plurality of fan blades is connected to the plurality of arms.

3. The drive unit of claim 2, wherein the fan blades of the plurality of fan blades are clipped onto the arms of the plurality of arms.

4. The drive unit of claim 1, wherein each fan blade of the plurality of fan blades has a plurality of fins on a face of the fan blade facing away from the stator.

5. The drive unit of claim 1, wherein the inverter housing defines a plurality of inverter cooling fins on a face of the inverter housing facing the fan.

6. The drive unit of claim 5, further comprising an air intake duct connected to the motor housing and the inverter housing for supplying air between the motor housing and the inverter housing to the fan and over the inverter cooling fins.

7. The drive unit of claim 1, wherein:
the motor housing defines a plurality of motor cooling fins on a face of the motor housing facing away from the inverter and the fan; and
the output shaft passes through the face of the motor housing facing away from the inverter and the fan.

8. The drive unit of claim 7, further comprising an air intake duct connected to the motor housing and the inverter housing for supplying air between the motor housing and the inverter housing to the fan and for supplying air over the motor cooling fins.

9. A drive unit for an electric vehicle comprising:

an outrunner motor comprising:

a motor housing;

a rotor disposed in the motor housing, the rotor having a sleeve and a plurality of permanent magnets connected to a radially inward side of the sleeve;

a stator disposed in the motor housing and radially inward of the rotor, the stator having a plurality of stator coils; and an output shaft disposed in part in the motor housing and radially inward of the stator, an end of the output shaft being disposed externally of the motor housing, the output shaft being operatively connected to and driven by the rotor, the output shaft and the rotor rotating together about an output shaft axis defined by the output shaft;

an inverter electrically connected to the plurality of stator coils, the inverter having an inverter housing connected to the motor housing, the output shaft axis extending through the inverter housing;

a fan disposed between the stator and the inverter housing, the fan being configured to draw air between the motor housing and the inverter housing and to supply this air into the motor housing; and a drive sprocket mounted to the end of the output shaft disposed externally of the motor housing;

the drive sprocket and the inverter being disposed on opposite sides of the stator.

10. An electric kart comprising:

a frame;

a seat connected to the frame;

two front wheels rotationally connected to the frame;

a steering wheel operatively connected to the two front wheels;

a rear-wheel axle rotationally connected to the frame;

two rear wheels connected to the rear-wheel axle;

a battery pack connected to the frame; and a drive unit connected to the frame, the drive unit comprising:

an outrunner motor comprising:

a motor housing;

a rotor disposed in the motor housing, the rotor having a sleeve and a plurality of permanent magnets connected to a radially inward side of the sleeve;

a stator disposed in the motor housing and radially inward of the rotor, the stator having a plurality of stator coils; and an output shaft disposed in part in the motor housing and radially inward of the stator, the output shaft being operatively connected to the rear-wheel axle to drive the two rear wheels, an end of the output shaft being disposed externally of the motor housing, the output shaft being operatively connected to and driven by the rotor, the output shaft and the rotor rotating together about an output shaft axis defined by the output shaft, the output shaft axis extending laterally;

an inverter electrically connected to the plurality of stator coils, the inverter having an inverter housing connected to the motor housing, the output shaft axis extending through the inverter housing, the battery pack being electrically connected to the inverter;

a fan disposed between the stator and the inverter housing, the fan being configured to draw air between the motor housing and the inverter housing and to supply this air into the motor housing; and an air intake duct connected to the motor housing and the inverter housing for supplying air between the motor housing and the inverter housing to the fan.

11. The electric kart of claim 10, wherein:

the battery pack is disposed in front of the motor; and a front end of the air intake duct extends over the battery pack.

12. The electric kart of claim 11, wherein an inlet of the air intake duct is vertically higher than an outlet of the air intake duct.

13. The electric kart of claim 10, wherein the drive unit is disposed laterally on one side of the seat.

14. The electric kart of claim 13, wherein the motor is disposed longitudinally between the battery pack and the rear-wheel axle.

* * * * *